Sept. 18, 1962 H. G. STENGER 3,054,143
PLASTIC FORMING MACHINE ORIFICE STRUCTURE
Filed March 30, 1959 2 Sheets-Sheet 1

INVENTOR.
HANS G. STENGER
BY
Mead, Browne, Schuyler & Beveridge
ATTORNEYS

Sept. 18, 1962 H. G. STENGER 3,054,143
PLASTIC FORMING MACHINE ORIFICE STRUCTURE
Filed March 30, 1959 2 Sheets-Sheet 2

INVENTOR.
HANS G. STENGER
BY
Mead, Browne, Schuyler + Beveridge
ATTORNEYS

United States Patent Office 3,054,143
Patented Sept. 18, 1962

3,054,143
PLASTIC FORMING MACHINE ORIFICE
STRUCTURE
Hans G. Stenger, Toledo, Ohio, assignor to Owens-
Illinois Glass Company, a corporation of Ohio
Filed Mar. 30, 1959, Ser. No. 802,963
2 Claims. (Cl. 18—14)

The present invention relates to a plastic forming machine orifice structure and more particularly to a structure for providing an annular orifice through which plastic can be expressed in the form of a tube.

The orifice structure of the present invention is particularly utilizable in conjunction with machines of the type wherein plastic articles, such as containers or the like, are made by a combined injection molding, extruding and blowing operation. The plastic material for both the injection molded and extruded portions of the article blank are expressed through an annular orifice. It is essential in the formation of the articles and the operation of the machine that the plastic material be expressed through the orifice without either turbulence or surface discontinuities and in a tubular configuration of truly annular cross-section.

The present invention provides a new and novel orifice structure wherein plasticized material is expressed through an annular orifice after passage through a tortuous flow path of alternately restricted and enlarged cross-section, so that the orifice can be defined by a free-standing or cantilevered mandrel disposed concentrically within, but not supported by, a surrounding sleeve. Additionally, the mandrel is readily adjustable axially and radially to insure adequate concentricity of the mandrel and the sleeve, and to insure accurate registry of the mandrel and the outlet nozzle.

It is, therefore, an important object of the present invention to provide an improved orifice-defining structure for a plastic forming machine.

Another important object is the provision of an improved mandrel and nozzle structure defining an annular orifice through which both injection molding and extrusion processes can be carried out.

It is yet another important object of this invention to provide an improved plastic supply conduit and nozzle structure for a plastic forming machine wherein plastic material is fed through a tortuous feed passage of varying cross-sectional dimension for flow substantially axially of a cantilevered mandrel and for issuance at an orifice defined in part by the mandrel, while subjecting the mandrel to only axial fluid pressure thrust.

Still another object is the provision of a fluid flow passage and orifice defined by concentric sleeve and mandrel elements cooperatively defining therebetween an elongated annular passage of variant cross-sectional dimension and effective to subject the mandrel element to only axial displacement forces.

Other objects and advantages of the invention will appear from the following detailed description taken in conjunction with the annexed drawings, in which, on the drawings.

Figure 1:
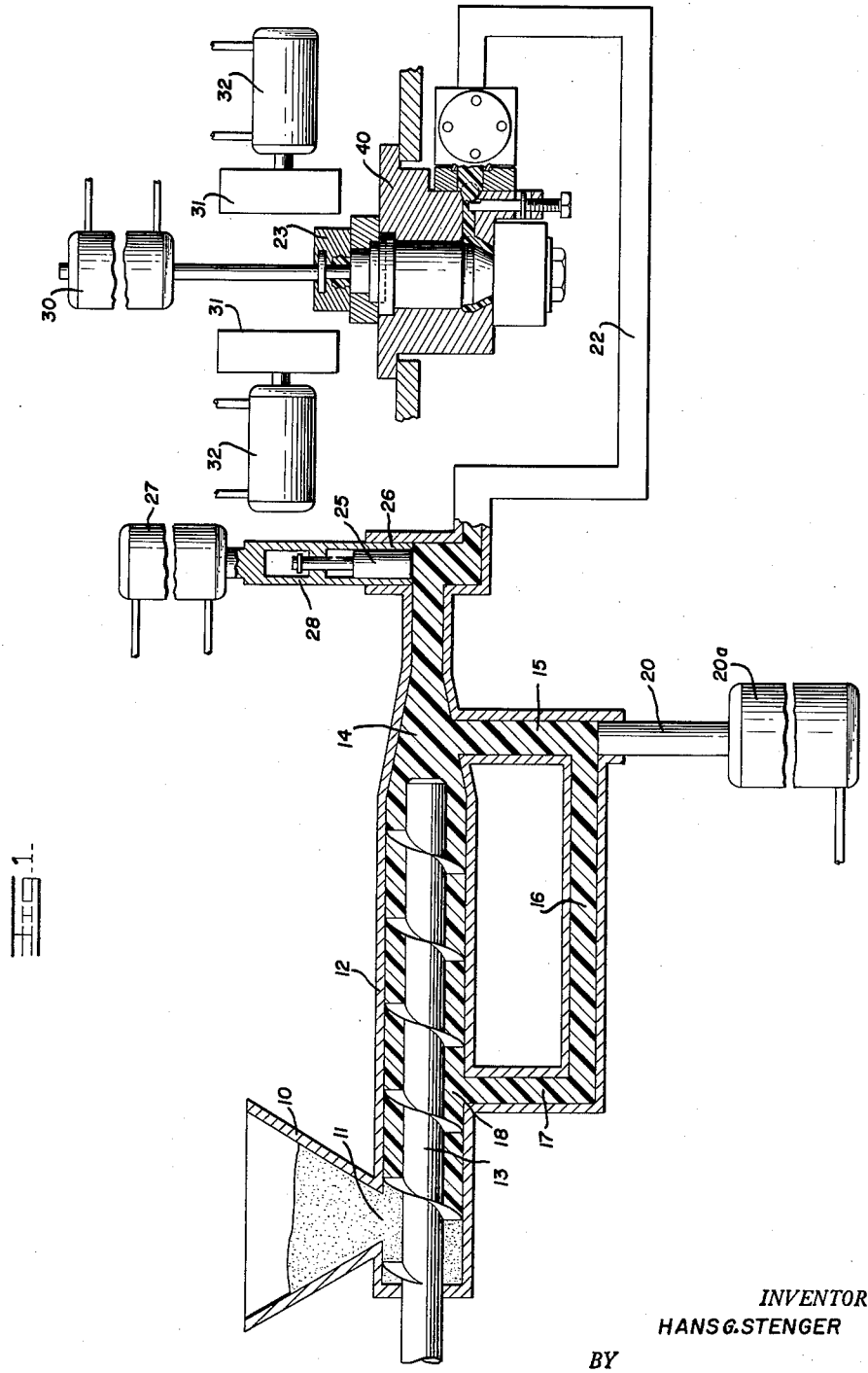
FIGURE 1 is a schematic view illustrating an overall apparatus for carrying out a plastic forming operation, the apparatus utilizing an orifice structure of the present invention.

The apparatus of the present invention and the method of this invention have been developed primarily for the utilization of plasticizable materials, preferably polyethylene or other similar thermoplastic materials.

Generally, the apparatus includes a hopper 10 within which granular polyethylene or similar material is stored and communicating at its lower end, as at 11, with an elongated chamber or barrel 12 of an extruder-plasticizer. Disposed within the plasticizer barrel 12 is an extruder screw 13 which rotates continuously to advance material to a discharge outlet 14. As the material is advanced by the extruder screw 13 within the plasticizer barrel 12, the material is worked under pressure and is subjected to heat to render the material plastic and in fluid form as it issues from the free end of the extruder tube 12. The free end of the extruder barrel communicates with a recirculation passage, including conduits 15, 16 and 17, which establishes communication from the discharge end 14 of the extruder screw to a portion 18 of the barrel displaced longitudinally from the hopper 10 and located at a point at which the material within the extruded barrel 12 is reduced to a viscous, fluid state. Recirculation of material through the recirculation passage is controlled by a recirculation piston 20a which is single acting and which is fluid pressure actuated, as by cylinder 21, to supplement the extruder output during certain portions of the cycle and which also serve to control recirculation of the thermoplastic material.

The primary purpose of recirculation is to accommodate continuous operation of the extruder screw 12 and to accommodate continuous plasticizing action without the necessity of halting and initiating extruder operations with each molding and blowing cycle. In effect, the recirculation passage forms a reserve or overflow accumulator into which the output of the extruder screw 13 flows when the extruder output is not being utilized, this accumulator being vented back to the plasticizer.

The extruder and plasticizer output communicates with a plurality of restricted annular orifices 21 (FIGURE 2) through an elongated passage 22. Overlying each such orifice 21 and in communication therewith is a neck mold 23 formed of separable neck mold halves. The neck or finish of the container is normally the most critical portion of the container, so far as dimensions are concerned, and in order to maintain these dimensions within the rather close tolerances required, the finish is preferably injection molded. The neck mold 23 thus becomes an injection mold. Injection molding usually requires pressures different from those normally provided by a combination extruder and plasticizer, and this different pressure is utilized only during the injection molding step of the cycle. For such intermittent injection operations, the apparatus of the present invention utilizes an injection piston 25 which is fluid-pressure displaceable into the conduit 22 filled with plasticized material intermediate the plasticizer outlet 14 and the orifice 21.

For the injection operation to be effective, the back flow of plastic to the plasticizer screw 13 must be prevented and a column of plasticized material must be isolated between the injection piston 25 and the neck mold 23. This isolation is carried out by a sleeve valve 26 concentric with the injection piston 25 and insertable into the plasticized material conduit. Further, this sleeve valve is closed at all times at which plastic material is not being expressed through the orifice from the extruder-plasticizer. An actuating means for sequentially actuating the sleeve valve and the injection piston and also for operating the sleeve valve independently of the piston is provided by fluid-pressure cylinder 27 having an actuating rod 28 rigid with the sleeve 26 and having a lost-motion connection with the injection piston 25.

Following the injection of the finish within the separable neck mold 23, extrusion of plasticized material from the extruder-plasticizer through the orifice 21 occurs during elevation of the neck mold 23 by its actuating cylinder 30, so that an extruded tubular extension is formed integral with the material filling the neck mold.

Following the extrusion of the tubular extension and movement of the neck mold 23 from its illustrated position overlying the orifice, the tubular extension is enclosed within a pair of separable blow molds 31 by actuation of cylinders 32 and blow air or other pressured fluid is introduced through the neck mold 23 to blow the container to its final configuration.

The above-described structure and its operation are more fully described in the copending U.S. application of R. C. Allen and L. E. Elphee, Serial No. 797,276, filed March 4, 1959, now Patent No. 3,008,192, and assigned to the assignee of the present invention.

Figure 2:
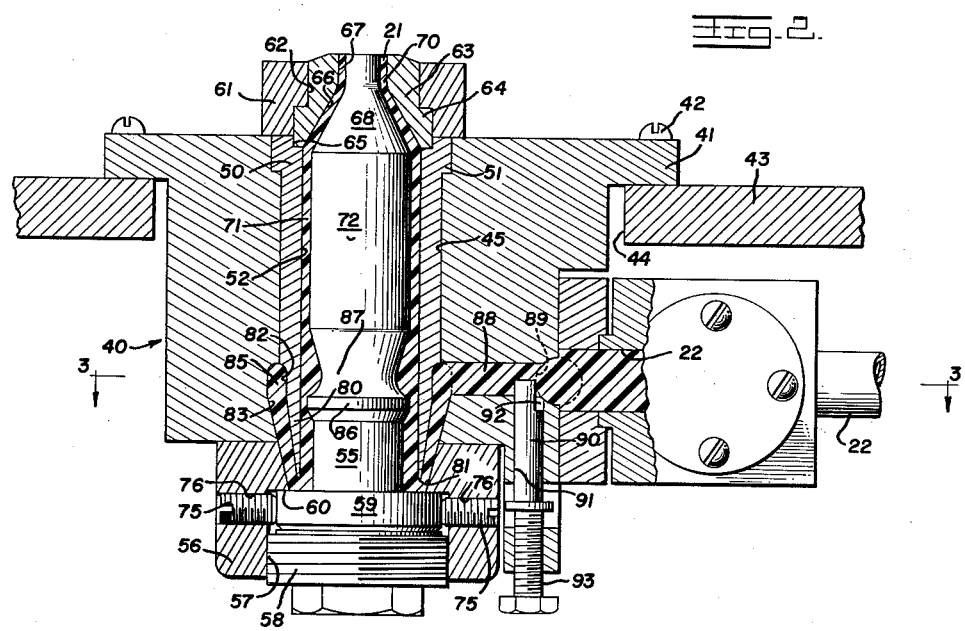
FIGURE 2 is an enlarged vertical sectional view taken through an orifice structure of the present invention.
Figure 3:
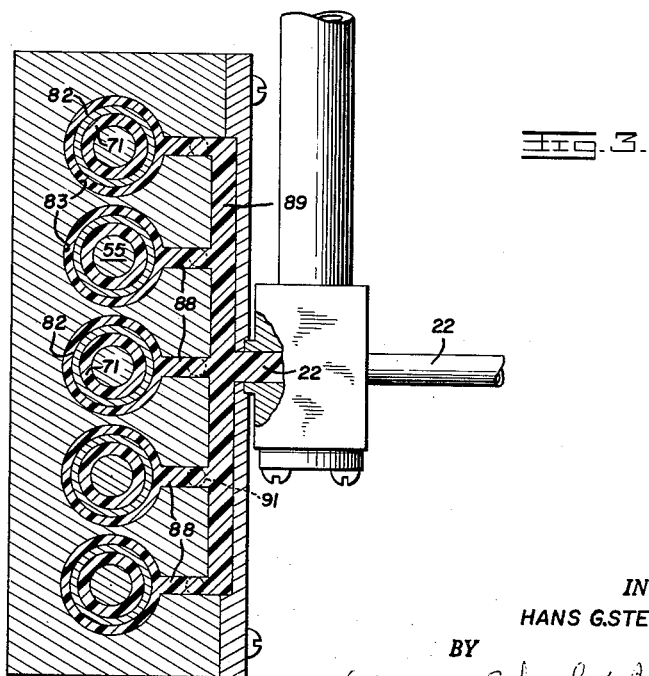
FIGURE 3 is a sectional view taken along the plane 3—3 of FIGURE 2.

The present invention is particularly concerned with the orifice-structure illustrated in FIGURES 2 and 3.

The material passage 22 feeds plasticized material into an orifice block 40 provided with opposing, longitudinally extending flanges 41 (FIGURE 2) secured to suitable means, as by screws 42, to a supporting table 43. This table is apertured, as at 44, to support the orifice block 40 and forms a part of the overall machine support structure.

The orifice block 40 is provided with a series of aligned vertically extending bores 45 in each of which is positioned an orifice sleeve 50, the sleeve having a radially outwardly projecting annular shoulder 51 seated upon a corresponding shoulder formed in the bore. Each such sleeve 50 is provided with a substantially cylindrical bore 52 receiving an elongated vertically extending mandrel 55. Underlying the block 40 and in alignment with each of the block bores 45, respectively, is an elongated adjustment block 56 fixedly secured to the orifice block 40 by suitable means, by welding or the like, and having a lower threaded aperture 57 adapted to receive an adjustment cap 58 threadedly inserted therein to maintain the mandrels in vertical position.

The mandrels 55 are each provided with a lower, radially enlarged boss 59 seated against interior shoulders 60 of the adjustment block 56. Superimposed over the sleeves 50 to lie against the upper ends thereof is an elongated orifice plate 61. This plate 61 overlies each of the sleeves 50 and is secured to the orifice block 40 by suitable means (not shown). The orifice plate 61 is provided with a series of apertures 62 and in each of these apertures is located a nozzle 63 annular in cross-section and provided with upper annular shoulders 64 underlying equivalent shoulders formed in the bores 62 of the plate 61. The sleeves 50 are recessed, as at 65, to receive the lower ends of the nozzles 63, and it will be seen that each of the nozzles 63 is securely clamped between the plate 61 and the corresponding sleeve 50. The nozzles 63 are each provided with a lower tapered bore 66 and an upper cylindrical bore 67 which cooperate with an upper tapered portion 68 of the corresponding mandrel 55 to define a generally upwardly convergent passage 70 for plasticized material. Each of these passages 70 communicates with a cylindrical passage 71 defined intermediate a cylindrical central portion 72 of the corresponding mandrel 55 and the cylindrical bore 45 of the corresponding sleeve 50.

It will be appreciated that the mandrels 55 project freely upwardly through the cylindrical bores 52 of the sleeves 50 and through the nozzles 63 to provide the unhindered and unobstructed passages 71 and 70. Yet the mandrels are individually adjustable both axially and radially. The mandrels are positioned axially by virtue of the abutment of their enlarged lower portions 59 with the shoulders 60 under the urging of the threaded plugs 58. The mandrels are positioned radially by set screws 75 threaded into radial tapped apertures 76 in the adjustment plate 56. Thus, threaded adjustment of the set screws 75 will shift the mandrel boss 59 laterally and will vary the position of each mandrel radially within its bore 52.

It will be noted that the sleeves 50 each project downwardly beyond the confines of the orifice block 40 and that the lower ends of the sleeves are tapered, as at 80, to terminate, as at 81, short of the embossment 59 of the associated mandrel 55. Further, it will be noted that the sleeves 50 are each provided with an exterior annular recess 82 adjacent the lower end thereof, which recess cooperates with a corresponding and registering recess 83 formed in the block 40 to provide an outer annular passage or chamber 85 communicating beneath the terminal ends 81 of the sleeves with the annular space 71 intermediate the mandrel 55 and the associated sleeve 50. The lower end of the annular passage 71 around the mandrel is constricted by an annular enlargement 86 formed on the mandrel. The passage 71 enlarges above the enlargement 86 by virtue of an annular groove 87 formed in the mandrel. The outer passage 85 communicates with the source of plastic material through a lateral passage 88 communicating with an elongated cross channel 89 which, in turn, communicates with the supply passage 22 heretofore described, as best seen from FIGURE 3.

Plastic flow thus occurs from the plasticizer outlet passage 14 past the sleeve 26 and piston 25 into the supply passage 22 (FIGURE 1). From the passage 22, plastic material is distributed to the plurality of orifices 21 by the cross channel 89. The cross channel 89, in turn, feeds plastic to the lateral passages 88. From the lateral passage 88 at each mandrel 55, the plastic material passes into the annular chamber 85, thence downwardly beneath the sleeve edge 81, upwardly past the restriction defined by the enlarged shoulder 86 of the mandrel, through the enlarged annular passage defined by the mandrel recess 87 and finally into the annular chamber 71 and the tapered chamber 70 for issuance through the orifice 21. By virtue of the flow of the plastic material through the alternately enlarged and restricted passages defining this somewhat tortuous flow path, the flow of plastic material is equalized about the mandrel, there is no differential speed of plastic flow at any peripheral portion of the mandrel, and the floating mandrel is subjected only to the axial flow of plastic material and not to any side or radial thrust.

Because of the fact that the cross channel 89 feeds a plurality of orifices (five orifices in the illustrated embodiment of the invention), separate flow control means are provided for regulating the flow of plastic material into the passages 88. Specifically, a flow control valve 90 (FIGURE 2) is provided in each passage 88. Each of these valves is generally cylindrical in configuration and is slidably disposed in a vertically extending valve passage 91, preferably of the same diameter as the upper passage 88. The upper end of each valve element 90 is recessed, as at 92, so that the diameter of the valve element is presented to the fluid plastic flow to serve as a flow control means. The valve elements 90 are adjustable axially into and out of the stream of plastic flowing through the corresponding passages 128 by means of adjustment screws 93. The valves 90 will be adjusted individually for the five illustrated orifices, so that each orifice will receive the same amount of plastic material from the passage 22 regardless of the lateral position of the particular orifice along the lateral or cross flow channel 89.

While preferred embodiments have been described above in detail, it will be understood that numerous modifications might be resorted to without departing from the scope of the invention as defined in the following claims.

What is claimed is:

1. In a device for extruding a tubular formation of plastic material, an orifice block having a plurality of aligned recesses open at each end, a sleeve in each of said recesses having an axial bore, a mandrel disposed concentrically in each of said sleeve bores, alternate axially spaced radially enlarged and reduced peripheral portions on each of said mandrels cooperating with the surrounding bore to define annular relatively restricted and relatively free flow passages for plastic material between the mandrels and the sleeve bores, said block having a single radial inlet for plastic material, a longitudinal passage running substantially the length of said block, branch conduits communicating with the longitudinal passage and each of the bore-mandrel passages, respectively, and individually adjustable fluid-flow control valve means in each of said branch conduits to balance the flow of plastic material from said radial inlet to each of said bore-mandrel passages.

2. In a device for extruding a tubular formation of plastic material, an orifice block having a recess open at each end, a sleeve in said recess having an open ended axial bore, an annular nozzle at one end of said sleeve communicating with said bore at one end thereof, the other end of said sleeve terminating in an annular knife edge, a mandrel disposed concentrically in said bore and projecting into said nozzle, said mandrel having a radially enlarged support portion spaced from the knife edge of said sleeve and secured to said block to close the adjacent end of said block recess, said mandrel being cantilevered from said support portion and cooperating with the sleeve and said nozzle to define a radially unobstructed annular flow passage of varying cross-sectional area for plastic material, said block having a radial inlet for plastic material communicating with an annular passage surrounding the exterior of said sleeve and extending axially therealong to said knife edge to introduce plastic material in an annular pattern beneath said sleeve knife edge into said annular flow passage.

References Cited in the file of this patent
UNITED STATES PATENTS

| | | |
|---|---|---|
| 1,876,256 | Maynard | Sept. 6, 1932 |
| 1,933,212 | Gora | Oct. 31, 1933 |
| 2,405,039 | Jesionowski | July 30, 1946 |
| 2,443,053 | Parmelee | June 8, 1948 |
| 2,595,210 | Clinefetter | Apr. 29, 1952 |
| 2,629,898 | Orsini | Mar. 3, 1953 |
| 2,688,154 | Huckfeldt | Sept. 7, 1954 |
| 2,710,987 | Sherman | June 21, 1955 |
| 2,736,921 | Mulbarger | Mar. 6, 1956 |
| 2,871,516 | Sherman | Feb. 3, 1959 |
| 2,975,475 | Heston | Mar. 21, 1961 |
| 2,978,748 | McCauley et al. | Apr. 11, 1961 |
| 2,980,958 | Ellis | Apr. 25, 1961 |